> 3,752,652
> Patented Aug. 14, 1973

3,752,652
METHOD AND APPARATUS FOR MEASUREMENT OF MINUTE QUANTITIES OF OXYGEN
Walter Ferdinand de Vleesschauwer, Sluiskil, Netherlands, assignor to S.A. Texaco Belgium N.V.
Filed Feb. 11, 1972, Ser. No. 225,486
Int. Cl. G01n 27/16, 27/18
U.S. Cl. 23—232 E          10 Claims

ABSTRACT OF THE DISCLOSURE

Method or system for measuring minute quantities of oxygen in a mixture with inert gas. A sample is passed over a reduced hydrogenation catalyst to react the oxygen with adsorbed hydrogen. Then hydrogen is passed over the catalyst while measuring the quantity of hydrogen used in reducing and saturating the catalyst once more. The quantity of oxygen in the sample is then determined by the stoichiometric relation between hydrogen and oxygen.

BACKGROUND OF THE INVENTION

Field of the invention

This invention concerns quantitative gas analysis, in general. More specifically, it deals with an oxygen analyzer that is applicable to the parts-per-million range.

Description of the prior art

Heretofore, the quantitative determination of oxygen in the parts-per-million range has been carried out by a colorimetric method using the blue color produced by action of oxygen on colorless ammoniacal cuprous chloride solution, or by gas chromatography using an ionization detector, if necessary, after concentration by adsorption on a molecular sieve in a cold trap which involves a temperature of minus 196 degrees centigrade. On the other hand, this invention has the advantage of being very reliable while using inexpensive equipment.

SUMMARY OF THE INVENTION

Briefly, this invention concerns a method of measuring minute quantities of oxygen mixed with an inert gas. It comprises the steps of passing a pre-determined quantity of said gas mixture over a reduced hydrogenation catalyst, and reacting said oxygen with the hydrogen on said catalyst to form water. It also comprises passing a predetermined quantity of hydrogen over said catalyst and measuring the quantity of hydrogen adsorbed in reducing said catalyst again.

Again, briefly, the invention concerns a system for quantitatively measuring in the parts-per-million range the oxygen in a mixture with inert gas. The system comprises a cartridge containing about 100 milligrams of %10% of platinum on aluminum-oxide catalyst, and heating means associated with said cartridge for heating said catalyst to about 100° C. It also comprises a multiport switching valve, and first tubing means for connecting an inlet port of said valve to a sample of said gas mixture. In addition, it comprises a second tubing means for connecting another inlet port of said valve to a source of hydrogen gas, and third tubing means for connecting an outlet port of said valve to one end of said cartridge. It also comprises fourth tubing means for connecting the other end of said cartridge to a katharometer for measuring the thermal conductivity of the effluent gas from said cartridge, and a soap-film flow meter connected to the output of said katharometer for measuring the rate of flow of said effluent gas, so that the quantity of oxygen may be determined in parts per million.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

Basically, the invention concerns passing an inert gas containing an amount of oxygen which is to be assessed, over a hydrogenation catalyst which contains preadsorbed hydrogen. The oxygen present in the gas will react quantitatively with the adsorbed hydrogen to form water. Then the hydrogen consumed by the oxygen may be determined, as well as replenished, by passing a discrete slug or pulse of hydrogen or hydrogen-containing inert gas over the catalyst. The difference between the hydrogen content of the pulse before and after passing the catalyst corresponds with the amount of hydrogen that has reacted with oxygen according to the basic chemical equation $$2H_2 + O_2 \rightarrow 2H_2O \tag{1}$$

The method involves hydrogen pulses that are passed over the catalyst during certain intervals. Then, by measuring the amount of hydrogen taken up in a particular interval between two instants of time, and measuring the flow rate of the sample gas, the oxygen content of the sample gas may be expressed by the following equation:

$$O = \frac{0.5V}{Ft} \tag{2}$$

wherein:

O is the volumetric oxygen content of the sample gas;
V is the volume of hydrogen consumed in an interval $t$ between two instants of time;
F is the flow rate of the sample gas; and
$t$ is the interval of time between two successive hydrogen pulses while the sample gas is being passed over the catalyst.

It will be understood that the factor 0.5 is due to the stoichiometry of the Equation 1 above.

Figure 1:
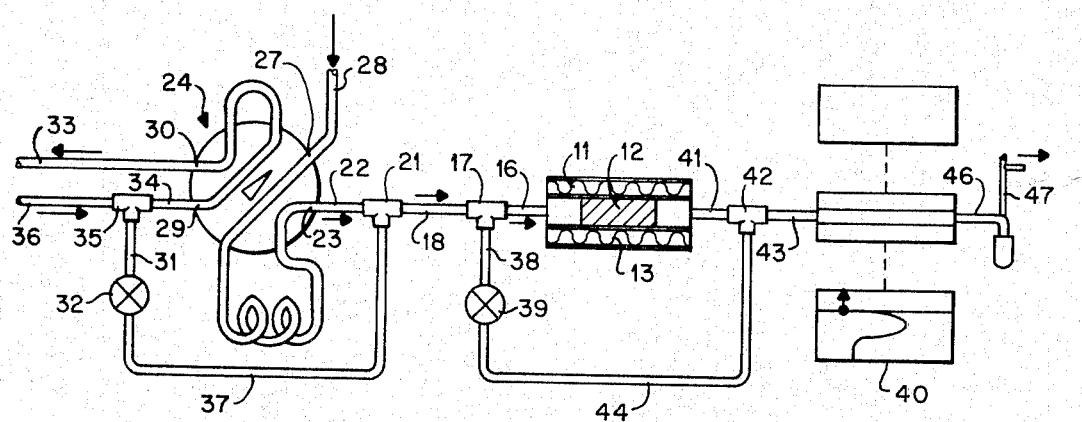
FIG. 1 is a schematic diagram illustrating a system for carrying out a method according to the invention.

In order to carry out the invention, apparatus like that illustrated in FIG. 1 may be employed. There is a cartridge 11 that contains therein a small quantity of hydrogenation catalyst 12, which is surrounded by a heating vessel 13 in order to maintain a desired temperature.

At the inlet end of the cartridge 11, there is a tube 16, which connects one side of a T-connector 17 to the input of the catalyst cartridge 11. The other side of the connector 17 has a tube 18 connected thereto. This tube goes between the T 17 and another T 21. The other side of T 21 has a tube 22 connected to it from an outlet port 23 that is part of a multiport sample valve 24. Valve 24 also has an inlet port 27 to which there is connected a tube 28 for introducing the sample-gas mixture.

At the other side of the valve 24, there is another inlet port 29 and an outlet port 30. A tube 30 is connected to the outlet port 30 for venting purposes, while a tube 34 is connected between the inlet port 29 and another T-connector 35. There is a tube 36 connected to the other side of the T 35 for introducing hydrogen or an hydrogen-inert gas mixture.

It may be noted that there is a bypass for the hydrogen around the sample valve 24. This includes a tube 31 that connects the T 35 to a valve 32. And, there is another tube 37 that connects the other side of the valve 32 to the base of the T 21.

Similarly, there is a bypass around the catalyst cartridge 11. It includes a tube 38 that connects the base of the T 17 to a valve 39. The other side of the valve 39 is connected to the base of a T 42 by another tube 44.

There is an instrument 40 that is used for measuring the amount of hydrogen in gas streams passing through or around the cartridge 11. The instrument that is schematically indicated is a katharometer. A katharometer is basically a thermal conductivity device which employs an electrical bridge arrangement with two gas-flow paths in order to compare the heat exchange in each of two separate gas streams. For the sake of simplicity, the katharometer 40 illustrated shows only a single path for gas flow. A commercial instrument which may be employed might be an appropriate one of the instruments manufactured by Gow-Mac Instrument Co., 100 Kings Road, Madison, N.J. 07940, and described in their Bulletin SB–10.

There is a path for flow of effluent gas from the cartridge 11. It includes a tube 41, and the T-connector 42 as well as another tube 43 which leads to the inlet side of the hydrogen-detector instrument 40. At the outlet end of instrument 40, there is a tube 46 which connects to a low-flow meter 47 that measures the rate of flow of the gas passing through the system.

Figure 2:
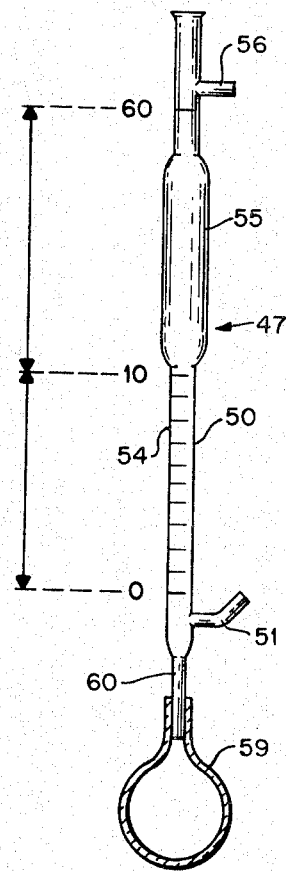
FIG. 2 is an enlarged elevation partly in cross-section illustrating a flow meter which may be employed in the system.

FIG. 2 illustrates in some detail a soap-film type gas-flow meter which type is schematically indicated in FIG. 1 as the meter 47. It will be appreciated that other types of gas-flow meter might be employed. For example, there is a commercial instrument described as a rotameter, an example of which is designated as a Fischer Porter "all-glass flowrator," Model 10 A 1017 A type 08 F 1/16–08–4, which could be used with a stainless steel (SS–16) or a sapphire (SA–16) float. Such a meter would be faster and easier to use than a soap-film type, but it is not as exact and it must be kept clean in order to avoid sticking.

FIG. 2 illustrates a soap-film type flow meter. It comprises a transparent tubular body 50 with a transverse nipple 51 near the lower end to receive a tube, e.g. tube 46, that would carry the gas to be metered. The body 50 consists of two calibrated sections 54 and 55. These extend from slightly above the nipple 51 to somewhat below another transverse nipple 56. The latter may be used for connecting a vent tube (not shown) if desired.

The total volume of both sections of the body 50 is calibrated by markings, as indicated. Consequently, by timing the movement of a volume of gas through the body 50, a rate of flow may be accurately determined. In the illustrated meter, the lower section 54 is calibrated from zero to ten millimeters, and the upper section 55 has a calibration mark for sixty millimeters.

At the lower end of the body 50, there is a flexible bulb 59 fitted over a lower tubular extension 60. In operation, there would be a soap solution (not shown) contained in bulb 59. Then, when gas flow is to be measured, the level of solution would be raised by squeezing the bulb 59 so that a soap film or bubble would be formed to make the leading edge of a volume of gas visible as the gas flows into the body 50 of the meter 47.

It will be understood that the water which is formed by the reaction in the cartridge 11, will be taken up by the catalyst support. However, there may be included a layer of water-adsorbing material (not shown), such as molecular sieve 3 or 4A, or anhydrite (anhydrous magnesium-perchlorate). Whichever adsorbent is employed, it would be located somewhere ahead of the hydrogen-detection instrument 40.

Method

The method steps will be preceded by a calibration of the hydrogen-detection instrument 40. Such calibration of the instrument would be performed by directing the same hydrogen or hydrogen-containing mixture, which is used for the oxygen determination, continuously through the catalyst cartridge 11 and the instrument 40, or just through the instrument 40 (by using the bypass loop 44). This would be done by opening the valve 32. Then, the hydrogen being introduced through the tube 36 will flow directly through the tubes 31, 37, 18 and 16 to the catalyst cartridge 11. Or, it will flow via the T 17, around cartridge 11, to continue through tube 43 into the instrument 40. A calibration factor for the instrument 40 may be determined from the constant deflection, or reading of the instrument, and from the flow rate of the hydrogen.

The steps of the method according to this invention may be described in some detail as follows. It will be appreciated that they might not necessarily be carried out only in the order recited.

One step is that of passing a predetermined quantity of the sample-gas mixture over the reduced hydrogenation catalyst by operating the valve 24. The catalyst will have been fully reduced during the calibration of the instrument 40, or if it is a fresh charge, by passing sufficient hydrogen over it beforehand using the bypass loop that includes tube 37.

Another step is that of reacting the oxygen in the sample-gas mixture with the hydrogen on the reduced catalyst to form water. This is accomplished in the cartridge 11 where the temperature will be maintained between 50 and 250° C. It has been found that 100° C. is to be preferred.

Another step is that of passing a predetermined quantity of hydrogen over the catalyst following the reaction of the sample oxygen. This step will restore the catalyst to its initial state.

Another step is that of determining the quantity of hydrogen which is adsorbed in reducing the catalyst again. It will be appreciated that this step makes use of the calibration factor that has been determined in the manner indicated above. By measuring the quantity of hydrogen in the effluent during the previous hydrogen-passing step, the oxygen in the sample may be determined applying the stoichiometry of Equation 1 above in the manner indicated by Equation 2. It will be understood that the flow rate of the sample gas will be measured by making use of the flow meter 47.

Using the operating conditions which follow, a specific example of determining the oxygen content of nitrogen which has been contaminated by passing pure nitrogen through polyethylene tubing is as follows:

Operating conditions

Catalyst temperature: between 50–250° C., preferably 100° C.

Flow rate of sample gas: between 10–100 ml./min.

Amount of catalyst: 50–500 mg. of a 1–5% by weight metal-supported catalyst; for example, 100 mg. of 0.6% Pt on $Al_2O_3$ catalyst (commercial designation Ketjen CK–306).

Samples size: 1–100 microliters of hydrogen depending upon the operating range.

EXAMPLE (a) Calibration of the instrument

Using a hydrogen-introgen mixture containing 0.92% $H_2$.

Flow rate hydrogen mixture: 37.70 ml. (STP) min.

Area produced on the recording instrument between the base line and the produced parallel line during one minute (in arbitrary units): 131,400 units/min.

The calibration factor expressed as the hydrogen equivalent of 1000 units is given by:

$$\text{cal. factor} = \frac{1000}{131400} \times 37.70 \times 0.92 \times 10$$

$$= 2.64 \ \mu l. \ H_2(STP)/100 \text{ units}$$

(b) Determination of the oxygen content of nitrogen contaminated by passing pure nitrogen through polyethylene tubing.

Flow rate sample gas: 35.6 ml. STP/min.
Time interval between two instants: 7.3 min.

|   | Units |
|---|---|
| Net hydrogen content of a pulse | 3,311 |
| Apparent hydrogen content in the oxygen determination | 662 |
| Hydrogen consumption during an interval | 2,649 |

Using the calibration factor: 2.64 μl. STP $H_2$/1000 units as determined in (a), the oxygen content of the contaminated nitrogen is given by $$\frac{0.5 \times 2.649 \times 2.64}{35.6 \times 7.3} \times 10^3 = 13.5 \text{ p.p.m. } O_2$$

It will be understod that the designation "STP" in the foregoing example stands for Standard Temperature and Pressure. Also, it may be noted that in using the soap-film meter 47, the measured flow rate needs to be corrected for the vapor pressure of water.

The apparatus and method of this invention provide a sensitive versatile technique for quantitative oxygen determination. Among the applications thereof are the determination of oxygen in inert gases and measurement of oxygen permeation through polymer films as well as measurement of oxygen diffusion through porous materials such as plastic tubing, catalysts or adsorbents.

While particular embodiments of the invention have been described above in considerable detail in accordance with the applicable statutes, this is not to be taken as in any way limiting the invention but merely as being descriptive thereof.

What I claim is:

1. Method of measuring minute quantities of oxygen mixed with inert gas, comprising the steps of
   passing a predetermined quantity of said gas mixture over a reduced hydrogenation catalyst,
   reacting said oxygen with the hydrogen on said catalyst to form water,
   passing a predetermined quantity of hydrogen over said catalyst, and
   measuring the quantity of hydrogen absorbed in reducing said catalyst again.

2. Method according to claim 1, further comprising the step of determining the quantity of oxygen in said gas mixture from the stoichiometric relation of oxygen to hydrogen in water.

3. Method according to claim 2, wherein
   said reacting and passing steps are carried out at catalyst temperature between fifty and two-hundred-fifty degrees centigrade,
   said passing steps are carried out at flow rates between ten and one-hundred milliliters per minute, and
   said predetermined quantity of hydrogen is between one and one-hundred microliters of hydrogen.

4. Method according to claim 3, wherein said catalyst employed is between fifty and five-hundred milligrams of a one-tenth to five percent by weight metal-supported catalyst.

5. Method according to claim 4, wherein
   said reacting and passing steps are carried out at catalyst temperature of about one-hundred degrees centigrade, and
   said catalyst is one-hundred milligrams of six-tenth percent by weight platinum on aluminum oxide.

6. Method according to claim 2, wherein
   said measuring step comprises calibrating a katharometer in terms of hydrogen content, and
   measuring the quantity of hydrogen in the effluent from said hydrogen-passing step by using said katharometer.

7. Apparatus for measuring minute quantities of oxygen in a mixture with inert gas, comprising in combination
   a quantity of reduced hydrogenation catalyst, means for alternately passing hydrogen or said mixture over said catalyst,
   means for measuring the quantity of flow of said gases over the catalyst, and
   means for quantitatively measuring the flow of hydrogen effluent after passing said mixture over said catalyst.

8. Apparatus according to claim 7, wherein
   said alternate passing means comprises a multiport valve, and
   said hydrogen-flow measuring means comprises a katharometer.

9. Apparatus according to claim 8, further comprising means for heating said catalyst.

10. A system for quantitatively measuring in the parts-per-million range the oxygen in a mixture with inert gas, comprising
    a cartridge containing about one hundred milligrams of six-tenths percent of platinum on aluminum oxide catalyst,
    heating means associated with said cartridge for heating said catalyst to about one hundred degrees centigrade,
    a multiport switching valve,
    fiirst tubing means for connecting an inlet port of said valve to a sample of said gas mixture,
    second tubing means for connecting another inlet port of said valve to a source of hydrogen gas,
    third tubing means for connecting an outlet port of said valve to one end of said cartridge,
    fourth tubing means for connecting the other end of said cartridge to a katharometer for measuring the thermal conductivity of the effluent gas from said cartridge, and
    a soap film flow meter connected to the output of said katharometer for measuring the rate of flow of said effluent gas,
    whereby the quantity of oxygen may be determined in parts per million.

References Cited
UNITED STATES PATENTS

| | | | |
|---|---|---|---|
| 2,582,885 | 1/1952 | Rosenblatt | 23—232 X |
| 2,848,306 | 8/1958 | Blumer | 23—232 |
| 3,242,717 | 3/1966 | Matle et al. | 23—254 X |
| 3,252,759 | 5/1966 | Simon | 23—232 X |
| 3,479,257 | 11/1969 | Shaver | 23—232 X |
| 3,567,383 | 3/1971 | Langley et al. | 23—232 E |

MORRIS O. WOLK, Primary Examiner

R. E. SERWIN, Assistant Examiner

U.S. Cl. X.R.

23—232 R, 254 R, 254 E